United States Patent [19]

Wachi

[11] E Patent Number: Re. 32,862

[45] Reissued Date of Patent: Feb. 14, 1989

[54] ELECTRONIC MUSICAL INSTRUMENT

[75] Inventor: Masatada Wachi, Hamamatsu, Japan

[73] Assignee: Nippon Gakki Seizo Kabushiki Kaisha, Hamamatsu, Japan

[21] Appl. No.: 774,092

[22] Filed: Sep. 9, 1985

Related U.S. Patent Documents

Reissue of:

[64] Patent No.: 4,282,790
Issued: Aug. 11, 1981
Appl. No.: 67,693
Filed: Aug. 20, 1979

[30] Foreign Application Priority Data

Aug. 29, 1978 [JP] Japan ..... 53-104345

[51] Int. Cl.[4] ..... G10H 1/08; G10H 7/00

[52] U.S. Cl. ..... 84/1.21; 84/1.24; 84/1.27; 84/1.28

[58] Field of Search ..... 84/1.01, 1.03, 1.09, 84/1.11, 1.19, 1.21-1.28

[56] References Cited

U.S. PATENT DOCUMENTS

| | | | |
|---|---|---|---|
| 3,515,792 | 6/1970 | Deutsch | 84/1.03 |
| 3,668,294 | 6/1972 | Kameoka et al. | 84/1.01 |
| 3,711,620 | 1/1973 | Kameoka et al. | 84/1.24 |
| 3,716,647 | 2/1973 | Kameoka et al. | 84/1.11 |
| 3,809,786 | 5/1974 | Deutsch | 84/1.01 |
| 4,018,121 | 4/1977 | Chowning | 84/1.01 |
| 4,082,027 | 4/1978 | Hiyoshi et al. | 84/1.01 |
| 4,103,582 | 8/1978 | Chibana | 84/1.24 |
| 4,108,040 | 8/1978 | Chibana et al. | 84/1.19 |
| 4,114,498 | 9/1978 | Chibana et al. | 84/1.19 |
| 4,132,140 | 1/1979 | Chibana | 84/1.11 |
| 4,133,242 | 1/1979 | Nagai et al. | 84/1.22 X |
| 4,135,422 | 1/1979 | Chibana | 84/1.01 |
| 4,138,915 | 2/1979 | Nagai et al. | 84/1.22 |
| 4,175,464 | 11/1979 | Deutsch | 84/1.24 |
| 4,185,532 | 1/1980 | Hiyoshi et al. | 84/1.26 |

*Primary Examiner*—Stanley J. Witkowski
*Attorney, Agent, or Firm*—Spensley Horn Jubas & Lubitz

[57] ABSTRACT

More than one sub-intervals or time-windows are provided in a one-cycle period of a musical tone selected at a keyboard of an electronic musical instrument. Each time-window passes a sine wave having a frequency predetermined for the time-window. The envelope of the spectrum of a time-window is determined by the shape and the width of the time-window, and the envelope of the spectrum of a sine wave passed from the time-window will become the convolution of the spectrum of the time-window and the frequency of the sine wave. The total area of the frequency spectrum included as frequency components of a musical tone can be covered by several time-windows, each having a different length and passing a sine wave of a different frequency. An amplitude control means controls the amplitude of each sine wave independently. The controlled amplitude level determines the spectrum intensity of the frequency region influenced by the corresponding sine wave. When the levels of all the sine waves are properly controlled, the resultant harmonic contents will be a desired one which produces a desired tone quality.

19 Claims, 18 Drawing Sheets

| | TIME WINDOW \ INPUT | $c_8$ | $c_7$ | $c_6$ | $c_5$ | $c_4$ | $c_3$ | $c_2$ | $c_1$ | $c_0$ | | | | | |
|---|---|---|---|---|---|---|---|---|---|---|---|---|---|---|---|
| OUTPUT | $W_1$ | $a_8$ | $a_7$ | $a_6$ | $a_5$ | $a_4$ | $a_3$ | $a_2$ | $a_1$ | $a_0$ | | | | | |
| | $W_2$ | | $a_8$ | $a_7$ | $a_6$ | $a_5$ | $a_4$ | $a_3$ | $a_2$ | $a_1$ | 0 | | | | |
| | $W_3$ | | | $a_8$ | $a_7$ | $a_6$ | $a_5$ | $a_4$ | $a_3$ | $a_2$ | 0 | 0 | | | |
| | $W_4$ | | | | $a_8$ | $a_7$ | $a_6$ | $a_5$ | $a_4$ | $a_3$ | 0 | 0 | 0 | | |
| | $W_5$ | | | | | $a_8$ | $a_7$ | $a_6$ | $a_5$ | $a_4$ | 0 | 0 | 0 | 0 | |
| | $W_6$ | | | | | | $a_8$ | $a_7$ | $a_6$ | $a_5$ | 0 | 0 | 0 | 0 | 0 |

ELECTRONIC MUSICAL INSTRUMENT

Matter enclosed in heavy brackets [ ] appears in the original patent but forms no part of this reissue specification; matter printed in italics indicates the additions made by reissue.

BACKGROUND OF THE INVENTION

The present invention relates to an electronic musical instrument, and more particularly, to an electronic musical instrument wherein tones are produced through digital processings.

In recent years, the technology of integrated circuits has undergone a remarkable progress, resulting in the development of various digital technics for generating musical tones. For one example, there is disclosed in the prior art an electronic musical instrument, in which a waveshape is stored in digital representations and is repetitively read out at a selectable rate, therefrom producing a musical note.

But this method for producing a musical note has disadvantages in that the quality of the produced musical tone is fixed by the waveshape which is previously stored, and that, for different tone qualities, different memories must be provided for storing different waveshapes. And, moreover, this method for producing a musical note is not suitable to change the generated tone quality as a function of time.

For another example, there is known in the prior art a musical instrument wherein a desired waveshape is synthesized by adding the fundamental frequency component and the harmonic components. But this method of synthesizing a tone waveshape has a disadvantage in that a large number of harmonic components must be processed when a precise amplitude control is required up to a higher degree of harmonics to obtain a high grade control for the tone quality. When many harmonic components are processed in a time division system, the system clock frequency must be increased in proportion to the number of the harmonic components, and when parallel processings are introduced to lower the clock frequency, parallel processing circuits must be provided resulting in the increase of the structure of the equipment.

SUMMARY OF THE INVENTION

Therefore, the general object of the invention is to eliminate these disadvantages inherent in the heretofore known method of producing a musical tone and to provide an electronic musical instrument in which desired harmonic components can be produced by a simple circuit arrangement, and the spectrum distribution of the harmonic components can be easily controlled to produce a musical tone having any desired tone quality selectable from a wide variety of tone qualities.

More particularly, one object of this invention is to provide an electronic musical instrument in which a specified frequency band which includes plural harmonic components is generated by a single circuit, and the spectrum intensity of all the harmonic components in the frequency band is controlled simultaneously by a single circuit.

Another object of this invention is to provide a means to determine, in accordance with the design of the musical instrument, the width of each frequency band in which the spectrum intensity is controlled simultaneously by a single circuit.

Still another object of this invention is to provide a means to minimize the side-lobe spectrum distribution and thus reduce the undesired mutual influences in the control of the harmonic components.

Further, an important object of this invention is to produce harmonic components in which the line spectra which indicate the component frequencies and the envelope shape of the spectrum which determines the intensities of the line spectra can be independently controlled.

Other and further objects, features and advantages of the invention will appear more fully from the following description taken in connection with the accompanying drawings.

DESCRIPTION OF THE PREFERRED EMBODIMENTS

Figure 1:
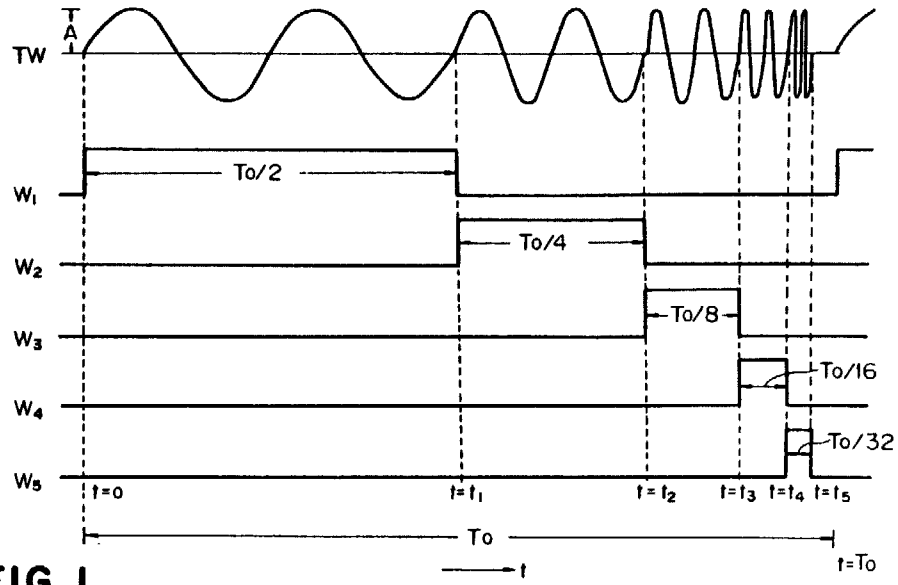
FIG. 1 shows an example of a tone waveshape and time-windows generated in an embodiment of this invention.

Referring now to FIG. 1, there are shown a tone waveshape and consecutive time intervals or time-windows generated in an embodiment of this invention.

The abscissa in FIG. 1 represents the time t, while the ordinate represents the amplitude of the waveshape. The generated tone waveshape is indicated by TW, and the time intervals or time windows are indicated by $W_1$, $W_2$, $W_3$, $W_4$, and $W_5$ respectively. The period of the musical tone to be produced is indicated by $T_O$, and the tone waveshape TW is equal to A sin $4(2\pi/To)t$ from $t=0$ to $t=t_1=T_O/2$, to A sin $8(2\pi/To)t$ from $t=t_1$ to $t=t_2=t_1+T_O/4$, to A sin $16(2\pi/To)t$ from $t=t_2$ to $t=t_3=t_2+T_O/8$, to A sin $32(2\pi/To)t$ from $t=t_3$ to $t=t_4=t_3+T_O/16$, and to A sin $64(2\pi/To)t$ from $t=t_4$ to $t=t_5=T_4+T_O/32$.

In a general expression, a sine wave of frequency $k/T_O$ is generated for a duration of $2T_O/k$ at each repetition cycle of the period $t_0$, where k=4, 8, 16, 32, 64, . . . This is equivalent to the output of the time-windows, when the input of the time-windows are continuous sine waves of A sin $k(2\pi/To)t$ and the time-windows pass the sine waves only for the durations of $2T_O/k$ at each repetition cycle of the period $T_O$. For this reason, the rectangular pulses $W_1$, $W_2$, $W_3$, $W_4$, and $W_5$ in FIG. 1 are called time-windows or time-window functions.

The tone waveshape TW of FIG. 1 can be easily analysed to a Fourier series. In order to obtain a general concept, the Fourier series of the tone waveshape TW will be deduced as a sum of the convolutions of the continuous sine wave frequencies and the frequency spectrums of the time-windows.

Figure 2A:
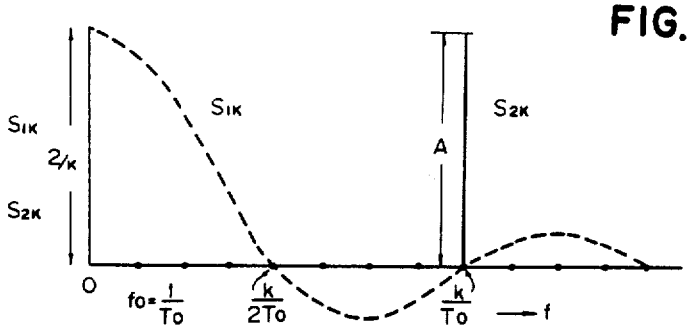
FIGS. 2A and 2B show examples of a spectrum corresponding to a sine waveshape which passes through a rectangular time-window.
Figure 2B:
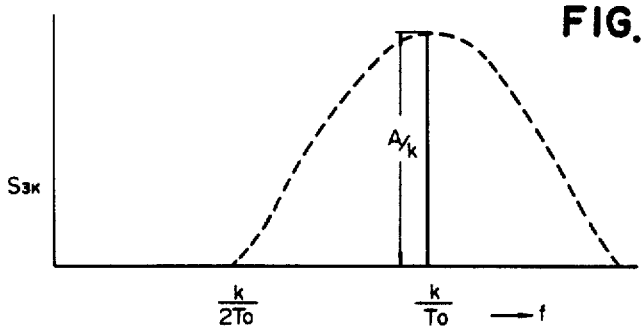

FIGS. 2A and 2B show examples of a spectrum corresponding to a sine wave passed through a rectangular time-window. The abscissas of FIGS. 2A and 2B represent the frequency f, while the ordinates represent the spectrum intensity. The curve $S_{1k}$ shows the spectrum envelope of a rectangular time-window having a width of $2T_O/k$, and $S_{2k}$ shows the line spectrum of a sine wave represented by A sin $k(2\pi/To)t$. $S_{3k}$ is the convolution of $S_{1k}$ and $S_{2k}$, and shows the spectrum envelope of the sine wave A sin $k(2\pi/To)t$ which is passed through the rectangular time-window.

It is well known that the spectrum envelope of a rectangular pulse can be represented by a formula sin x/x. When the time-window is cyclically repeated with the repetition period of $T_O$, the frequency spectrum of the time-window will be composed of a series of line spectra beginning from f=O (meaning a direct current component) and spaced by a regular frequency interval of $f_O=1/T_O$. And when the width of the time-window is not changed, the spectrum envelope remains the same for different values of the repetition period $T_O$. In the example illustrated by FIGS. 2A and 2B, the spectrum envelopes $S_{1k}$ is shown for k=8, and the series of the line spectra is denoted by dotted points on the frequency axis. When the spectrum of the time-window is a series of line spectra, the spectrum of the sine wave which is passed through the time-window is also a series of line spectra which is calculated as the convolution of the line spectrum k/To and the series of line spectra of the time-window.

Figure 3:
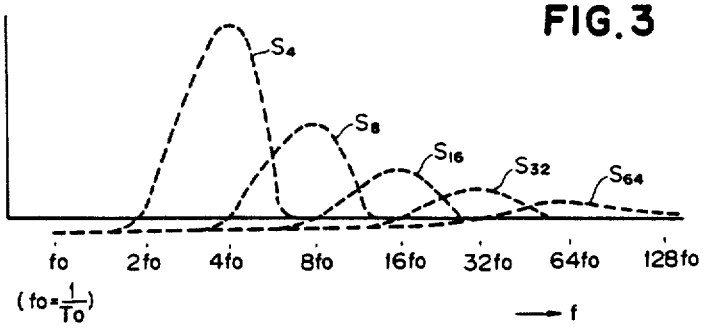
FIG. 3 is a spectrum diagram illustrating the spectrum envelope of the waveshape shown in FIG. 1.

FIG. 3 is a spectrum diagram illustrating the spectrum envelope of the waveshape TW shown in FIG. 1. In FIG. 3, the abscissa represents the frequency f in logarithmic scale and the ordinate represents the spectrum intensity. $S_4$, $S_8$, $S_{16}$, $S_{32}$, and $S_{64}$ are respectively the spectrum envelopes corresponding to the portions of the waveshape TW of the frequencies of $4/T_O$, $8/T_O$, $16/T_O$, $32/T_O$, and $64T_O$. It will be apparent from the descriptions in connection with FIGS. 2A and 2B that the spectrum envelope of the tone waveshape TW in FIG. 1 will become as shown in FIG. 3.

The tone waveshape TW in FIG. 1 can be easily generated by a simple digital circuit, the intensity of the generated frequency spectrum is decreased in inverse proportion to the value of k presenting a desirable frequency characteristic of 6 db attenuation per octave, and the amplitude of each sine wave corresponding to a timewindow can be independently controlled by a single control circuit in a time division system. These characteristics of the tone waveshape are advantageous to obtain a desired tone quality.

The bandwidth of the frequency spectrum (for example the bandwidth from f=O to $f=k/2T_O$ of the spectrum envelope $S_{1k}$ in FIGS. 2A and 2B) corresponding to a time window can be easily changed, as the bandwidth is inversely proportional to the time width of the time-window. As was described in the foregoing paragraph, the amplitude of each sine wave corresponding to a time-window can be independently controlled, and therefore, the change of the width of a time-window means the change of the frequency band which can be independently controlled. In other words, the degree of the frequency resolution in the control of the harmonic components, can be changed by changing the time width of the time-window. In the embodiments of this invention as will be described in the following paragraphs, the degree of the frequency resolution is predetermined at a value which is most suitable for the design purpose, by determining the time widths of the time-windows.

Figure 4:
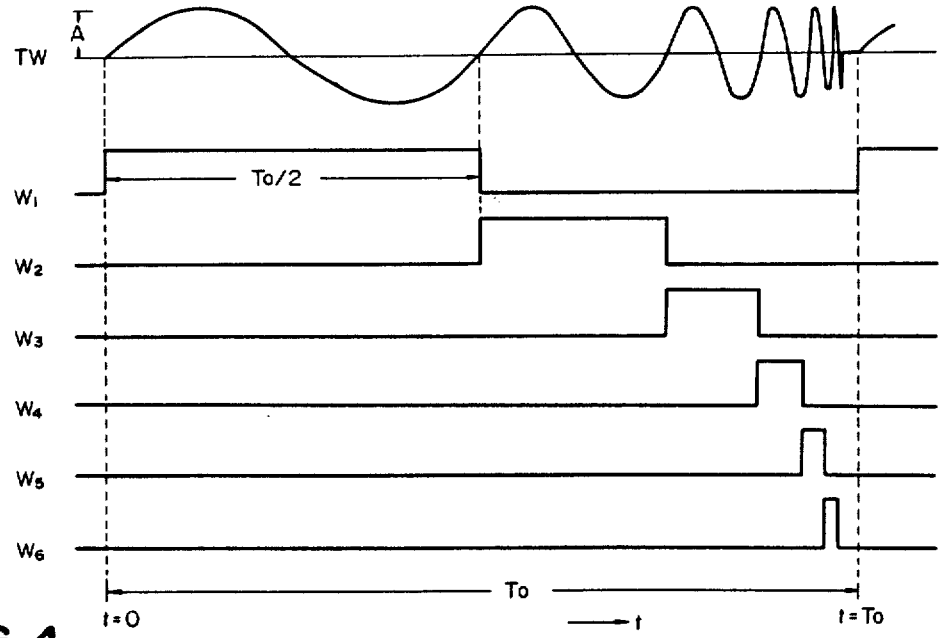
FIG. 4 shows another example of a tone waveshape and time-windows generated in another embodiment of this invention.

FIG. 4 shows another example of a tone waveshape and time-windows generated in another embodiment of this invention. In FIG. 4, the same notations with FIG. 1 have the same meanings. In the example of FIG. 1, a sine wave of A sin $k(2\pi/To)t$ passes a time-window having a time width of $2T_O/k$, and in the example of FIG. 4, a sine wave of A sin $k(2\pi/To)t$ passes a time-window having a time width of $T_O/k$. Therefore, in the example of FIG. 4, k=2, 4, 8, 16, 32, and 64 correspond to the time-window $W_1$, $W_2$, $W_3$, $W_4$, $W_5$, and $W_6$ respectively. In the example of FIG. 1, two complete cycles of a sine wave pass the corresponding time-window, while, in the example of FIG. 4, only one complete cycle of a sine wave passes the corresponding time-window. Therefore each spectrum envelope corresponding to each time-window in FIG. 4, has a double bandwidth compared to the corresponding spectrum envelope of the time-window in FIG. 1.

Figure 5:
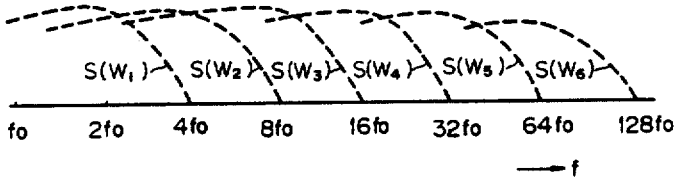
FIG. 5 is a spectrum diagram illustrating the spectrum envelope of the waveshape shown in FIG. 4.

FIG. 5 is a spectrum diagram illustrating the spectrum envelope of the tone waveshape shown in FIG. 4, $S(W_1)\sim S(W_6)$ in FIG. 5 shows the spectrum envelopes of the sine waves which pass time-windows $W_1\sim W_6$ respectively. As described in connection with FIG. 3, the spectrum envelope shown by FIG. 5 has also 6 db attenuation per octave characteristic and the spectrum intensity is decreased by 6 db for each one step from $S(W_1)$ to $S(W_6)$, the intensity of $S(W_6)$, for example, being 1/32 of the intensity of $S(W_1)$. In FIG. 5 and also in all the following drawings, however, the spectrum envelope curves are represented with this 6 db per octave attenuation compensated (neglected) in order to show the curves more distinctly.

Figure 6:
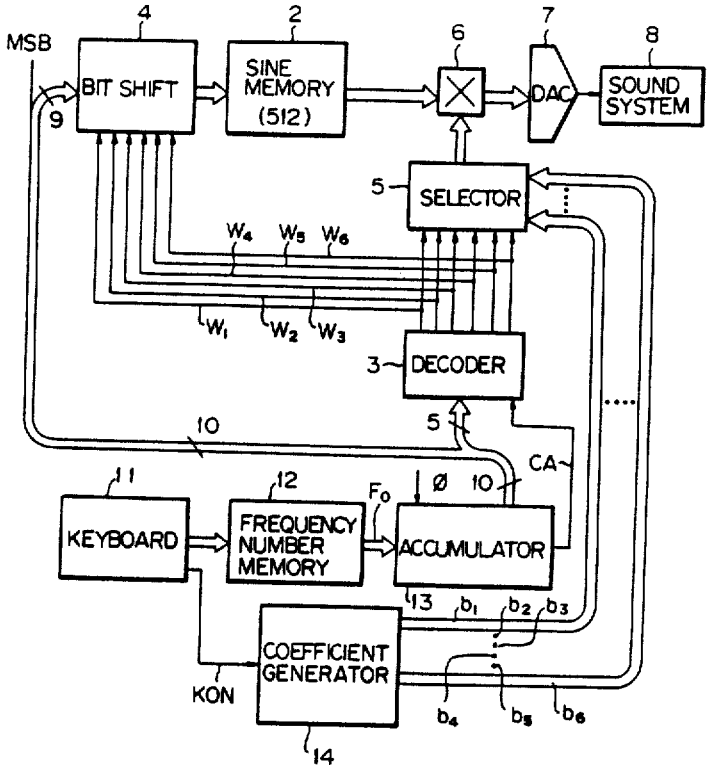
FIG. 6 is a block diagram of an embodiment of this invention.

One example of the means for generating the tone waveshape TW in FIG. 4 will now be described. FIG. 6 is a block diagram of an embodiment of this invention. In FIG. 6, 11 is a keyboard, 12 is a frequency number memory, 13 is an accumulator, 14 is a coefficient generator, 2 is a sine wave memory of 512 words, 3 is a decoder, 4 is a bit shifter, 5 is a selector, 6 is a multiplier, 7 is a digital to analog converter (hereinafter will be abbreviated as DAC), and 8 is a sound system.

When a key is depressed at the keyboard 11, the information of the key is received by the frequency number memory 12 which outputs the digital number $F_0$ corresponding to the fundamental frequency assigned to the key. This digital number $F_O$ is cumulatively added in the accumulator 13 at a rate equal to the frequency of the clock pulse $\phi$, and consequently the accumulator overflows a carry pulse CA from the MSB (most significant bit) of the accumulator. *Thus the accumulator 13 provides uniformly progressing phase angle information.* The modulus of the accumulator 13 and the frequency of the clock pulse $\phi$ are so designed as to make the frequency of the carry pulse CA equal to the fundamental frequency $f_O$ assigned to the key. *Accordingly, the phase angle information begins when the modulus of the accumulator is reached, which corresponds to a predetermined phase point of the fundamental period* $1f_O$ of the musical tone to be generated. The fundamental frequency $f_O$ is proportional to the number $F_O$, and different values of $F_O$ for different keys are predetermined and stored in the frequency number memory 12.

The significant 10 (ten) bits of the accumulator 13 are used to address the sine wave memory 2 and also to generate the gating signal for the decoder 3. In FIG. 6 and also in the following drawings, the number of bits constituting a word which is transmitted on a signal line is designated by a numeral at the side of the block line crossed by a short dash.

*From the above two paragraphs, it will be appreciated that the digital number* $F_0$ as it is accumulated by the accumulator 13 constitutes the uniformly progressing phase angle information representing at any point in time a particular phase of the sine wave stored in memory 2. It will also be appreciated that the progressing phase angle information is reset and repeats at a frequency $f_0$ (the fundamental frequency of the tone to be produced) determined by the value of the digital number $F_0$.

From the significant 10 bits of the output of the accumulator 13, the MSB is excluded and other 9 bits are received by the bit shifter 4. The decoder 3 and the bit shifter 4 are provided in order to change the frequency of the sine wave which is read out from the sine wave memory 2, when the time-window changes from $W_1$ to $W_6$ as shown in FIG. 4. *Thus the frequency of the read out sine waveshape effectively changes as the generated phase information is modified by the cooperation of the decoder 3 and the bit shifter 4 during the fundamental period.* It will be easily understood that the frequency of the sine wave readout will be $2f_O$ when all the 9 bits which are received by the bit shifter 4 are used to address the sine wave memory 2.

Figure 7:
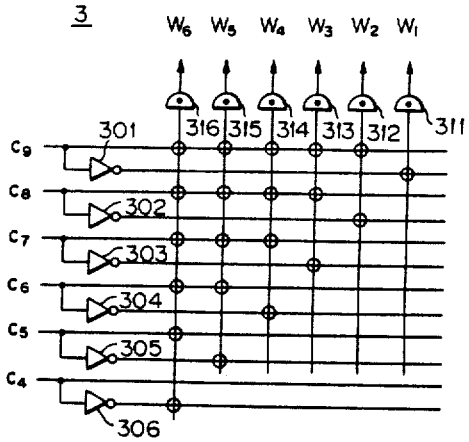
FIG. 7 is a circuit diagram illustrating an example of the decoder shown in FIG. 6.

FIG. 7 is a circuit diagram illustrating an example of the decoder 3 shown in FIG. 6. The decoder 3 receives the 6 bits ($c_9$, $c_8$, $c_7$, $c_6$, $c_5$, and $c_4$) from the significant 10 bits ($c_9 \sim c_O$) of the output of the accumulator 13, and generates the time windows $W_1$, $W_2$, $W_3$, $4_4$, $W_5$, and $W_6$ as shown in FIG. 4. In FIG. 7, 301~306 are inverters, 311~316 are AND gates, and the small circles at the cross points of the vertical and horizontal lines mean that the circled horizontal lines constitute the input lines to the gate situated at the end of the vertical line. (In the following drawings, similar expressions are used.) It will be apparent that the gates shown as the time-windows $W_1 \sim W_6$ in FIG. 4 are generated by the circuit shown in FIG. 7.

Figure 8:
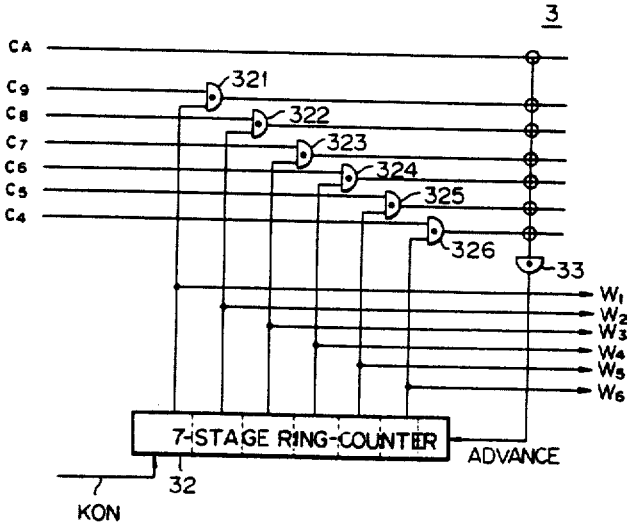
FIG. 8 is a circuit diagram illustrating another example of the decoder shown in FIG. 6.

FIG. 8 is a circuit diagram illustrating another example of the decoder 3 shown in FIG. 6. In FIG. 8, 32 is a 7 stage ring-counter, 321~326 are AND gates, 33 is an OR gate, $c_9 \sim c_4$ are the same with the notations in FIG. 7, CA shows the carry pulse from the accumulator 13, and KON is the key-status signal of the key which is operated at the keyboard 11. The ring-counter 32 is set at the initial state by the KON signal when a key is operated and is shifted by the output of the OR gate 33. It is apparent that the gates shown in FIG. 4 as the time-windows $W_1 \sim W_6$ are generated at the corresponding stages of the ring-counter 32.

Figures 9, 10:
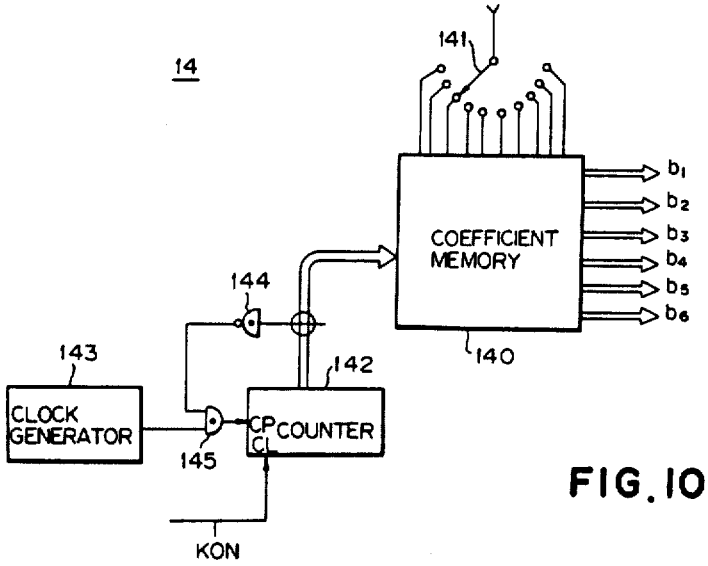
FIG. 9 is a connection diagram illustrating the internal connection of the bit shifter means shown in FIG. 6.
FIG. 10 is a block diagram showing an example of the coefficient generator shown in FIG. 6.

FIG. 9 is a connection diagram illustrating an example of the internal connection of the bit shifter 4 in FIG. 6. The input to the bit shifter 4 is the 9 bits ($c_8 \sim c_O$) taken from the significant 10 bits ($c_9 \sim c_O$) with the MSB ($c_9$) excluded. The control input to the bit shifter 4 is the time-window $W_1 \sim W_6$ from the decoder 3. The output of the bit shifter 4 is the 9 bits ($a_8 \sim a_O$) which address the sine wave memory 2. The connections between $c_8 \sim c_O$ and $a_8 \sim a_O$ are changed in accordance with the time-windows $W_1 \sim W_6$ as shown in FIG. 9. Thus, in the duration of $W_1$, there are connections between $c_8$ and $a_8$, $c_7$ and $a_7$, . . . , and a sine wave of frequency $2f_O$ is readout from the sine wave memory 2. And, in the duration of $W_2$, there are connections between $c_7$ and $a_8$, $c_6$ and $a_7$, . . . , $a_O$ being always at logic "0", and the sine wave memory 2 is readout at even-numbered addresses (that is, 256 words out of 512 words memory) to generate a sine wave of frequency $4f_O$. *Thus the decoder 3 and bit shifter 9 cooperate to modify the uniformly progressing phase information generated from the accumulator 13. The waveshape memory 2 is read out in accordance with this modified phase information.* In this way, the output from the sine wave memory 2 will become as shown by the tone waveshape TW in FIG. 4.

FIG. 10 is a block diagram showing an example of the coefficient generator 14 in FIG. 6, and 140 is a coefficient memory, 141 is a changeover switch for the coefficient memory 140, 142 is a counter, 143 is a clock generator which generates a clock pulse at a relatively low repetition rate, 144 is a NAND gate, and 145 is an AND gate. As described in connection with FIG. 6, the time-windows $W_1 \sim W_6$ are changed successively at the output of the decoder 3, and the frequency of the sine wave which is readout from the sine wave memory 2 is successively changed. In synchronism with the change of the frequency of this sine wave, the coefficient which determines the amplitude of the corresponding sine wave is successively changed at the selector 5, and the selected coefficient is transmitted to the multiplier 6 where the coefficient controls the amplitude of the corresponding sine wave. *Thus the selected coefficients constitute amplitude control information, which vary with time within the fundamental period* $1/f_O$. This variation occurs in response to the uniformly progressing phase angle information provided by the accumulator 13 to the decoder 3, since the decoder 3 and the selector 5 select different values of amplitude coefficients in response to the changed values of the phase angle information. In the embodiment shown in FIG. 6, 6 (six)

coefficients $b_1 \sim b_6$ which correspond to the 6 time-windows $W_1 \sim W_6$ are transmitted from the coefficient generator 14 to the selector 6.

In order to obtain a desired tone quality, these coefficients must be set at proper values, and to realize the variation of the tone quality as a function of time to imitate a natural musical instrument, these coefficients must be changed as functions of time. Moreover, the form of the time function which determines the tone quality must be changed when the nature of the generated tone quality is to be changed. To meet these requirements, the coefficient memory 140 has several sets of the memories of coefficients $b_1 \sim b_6$ for which different values are stored at different addresses. The player of the musical instrument selects any one set of these coefficient memories by the switch 141.

The coefficient memory 140 is addressed by the contents of the counter 142, and the selected sets of the coefficients $b_1 \sim b_6$ which change as the address is changed, are readout. The counter 142 is progressed by a clock pulse of a suitable frequency from the clock generator 143. It is assumed that the output frequency of the clock generator 143 is adjustable. Also it is assumed that the maximum value of the address of the coefficient memory 140 is designed to coincide with the maximum value of the contents of the counter 142, and when all the bits of the counter 142 become at logic "1", the AND gate 145 is cut off by the output of the NAND gate 144, thereby inhibiting the input of the clock pulse to the counter 142. When the signal KON indicates that a key is newly depressed at the keyboard 11, the counter 142 is cleared. Thus, the coefficients $b_1 \sim b_6$ are readout, with these 6 coefficients in parallel, for the duration where the signal KON indicates that the key is in a depressed state, or from the time when the signal KON indicates that a key is newly depressed to the time when the clock pulse input is inhibited by the AND gate 145. These coefficients $b_1 \sim b_6$ are received by the selector 5.

As the coefficients $b_1 \sim b_6$ control the amplitudes of the sine waves in the time-windows $W_1 \sim W_6$ in FIG. 4 respectively, the intensities of the spectrum envelopes $S(W_1) \sim S(W_6)$ in FIG. 5 are controlled by the respective coefficients $b_1 \sim b_6$. This means that, in this embodiment of the invention, a single multiplier 6 can control the intensities of the spectrum envelopes $S(W_1) \sim S(W_6)$ independently.

The output of the multiplier 6 is converted to an analog voltage by the DAC 7, and this analog voltage is further converted to a musical sound in the sound system 8. The DAC 7 and the sound system 8 are well known and will need no further explanations.

As described in the foregoing paragraphs concerning the comparison between FIG. 1 and FIG. 4, the time width of a time-window in FIG. 4 is relatively small for the period of the sine wave which passes through the time-window, and therefore, the bandwidth of an independently controllable spectrum envelope is relatively wide, with the adjoining envelopes overlapping to each other as shown in FIG. 5. In other words, the frequency resolution in the control of the spectrum intensity is relatively poor for the tone waveshape TW in FIG. 4.

When an improvement in the frequency resolution is desired, the ratio of the time width of a time-window to the period of the corresponding sine wave is to be increased. For example, the tone waveshape TW in FIG. 1 has an improved frequency resolution compared to the tone waveshape which is generated by the circuit shown in FIG. 6.

Figure 11:
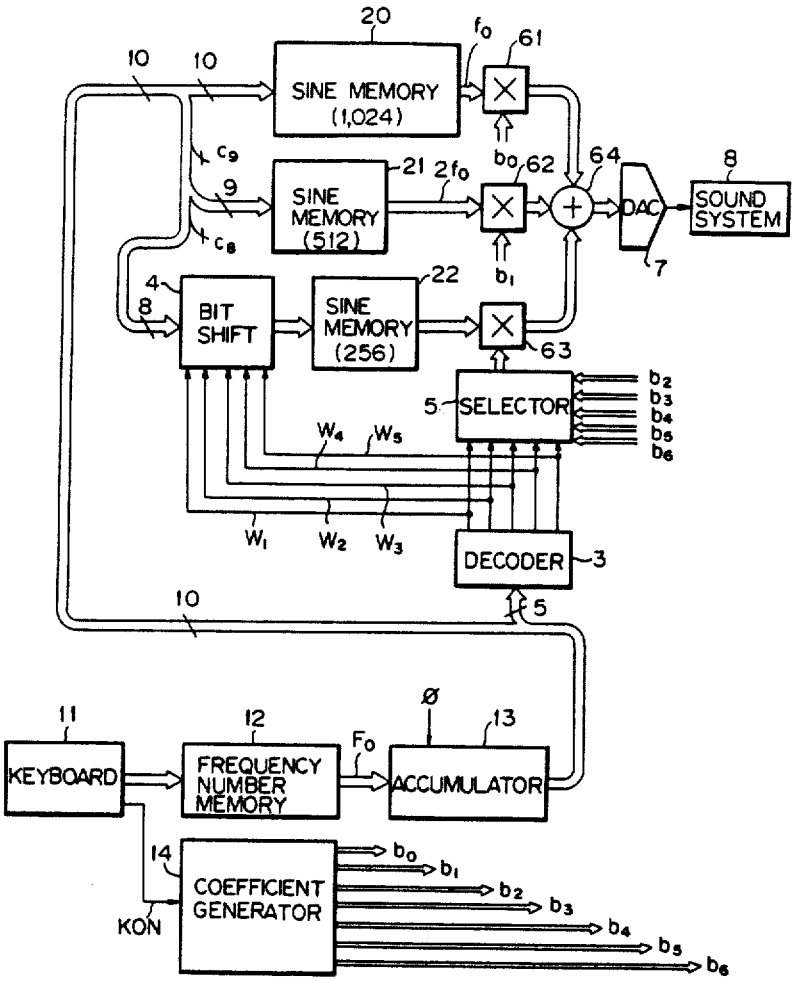
FIG. 11 is a block diagram of another embodiment of this invention.

FIG. 11 is a block diagram of another embodiment of this invention, and the same numerals indicate the same or the like components with FIG. 6, and will need no further descriptions. And, 20 is a sine wave memory of, for example, 1024 words capacity, 21 is a sine wave memory of 512 words capacity, 22 is a sine wave memory of 256 words capacity, 61, 62, 63 are respectively multipliers, and 64 is an adder.

The significant 10 bits ($c_9 \sim c_0$) from the accumulator 13 address the sine wave memory 20 to readout a continuous sine wave of frequency $f_0$, the 9 bits ($c_8 \sim c_0$) taken from the 10 bits ($c_9 \sim c_0$) address the sine wave memory 21 to readout a continuous sine wave of frequency $2f_0$. The 8 bits ($c_7 \sim c_0$) taken from the 9 bits with the $c_8$ bit excluded, are received by the bit shifter to readout the tone waveshape TW in FIG. 1 from the sine wave memory 22.

The circuit of the decoder 3 in FIG. 11 is similar to the circuit shown in FIG. 7 or FIG. 8, provided that the decoder 3 in FIG. 11 is devoid of the circuits corresponding to the time-window $W_6$, since the tone waveshape TW in FIG. 1 has only five time-windows $W_1 \sim W_5$. Thus, the inverter 306 and the AND gate 314 in FIG. 7 are not necessary for the decoder 3 in FIG. 11; and for the decoder 3 in FIG. 11, the AND gate 326 in FIG. 8 is not necessary and the ring-counter is a six stage counter. Therefore, the input to the decoder 3 in FIG 11 is the significant 5 bits ($c_9$–$c_5$) and the output is the 5 time-windows $W_1 \sim W_5$.

The internal connection of the address switching means 4 in FIG. 11 is similar to the connection shown by FIG. 9, but the $c_8$ bit in the input, the $a_8$ bit in the output, and the connection for the time-window $W_6$ are devoid in the bit shifter 4 in FIG. 11.

Further, the coefficient generator 14 of FIG. 11 has a circuit similar to the circuit shown by FIG. 10, but the coefficient generator 14 of FIG. 11 generates not only the 5 coefficients $b_2 \sim b_6$ for the time-windows $W_1 \sim W_5$ but also the coefficients $b_0$, $b_1$ corresponding to the output from the sine wave memories 20, 21. The coefficients $b_2 \sim b_6$ are transmitted to the selector 5, and the coefficients $b_0$, $b_1$ are respectively transmitted to the multipliers 61, 62.

In these circuit connections, the sine wave memory 22 is readout in a similar way in which the sine wave memory 2 in FIG. 6 is readout, except that the sine wave memory 22 is readout for two repeated sine wave cycles per each one time-window, generating the tone waveshape TW in FIG. 1. And the spectrum envelopes corresponding to these time-windows $W_1 \sim W_5$ become as shown by $S_4 \sim S_{64}$ in FIG. 3. The amplitudes of these spectrum envelopes $S_4 \sim S_{64}$ are controlled at the multiplier 63 by the corresponding coefficients $b_2 \sim b_6$. From the comparison between FIG. 3 and FIG. 5, it is clear that the embodiment illustrated by FIG. 11 can produce narrower frequency bands of independently controllable spectrum envelopes than the embodiment illustrated by FIG. 6. But, as shown by FIG. 3, the tone waveshape TW of FIG. 1 which is readout from the sine wave memory 22 of FIG. 11 contains very weak spectrum intensities for the frequency components $f_0$, $2f_0$, the sine wave memories 20, 21 are provided to generate these two frequency components $f_0$, $2f_0$, and the output of these sine wave memories 20, 21 are amplitude-controlled at the multipliers 61, 62 by the coefficients $b_0$, $b_1$ respectively.

The output values of these multipliers 61, 62, 63 are added at the adder 64 and the resultant is converted to an analog voltage by the DAC 7.

In the embodiment shown in FIG. 11, there are provided three sine wave memories 20, 21, and 22. But it is apparent that one single sine wave memory can be readout in a time division system to generate the three different waveshapes by a minor modification in the memory reading circuit.

In the embodiments shown by FIG. 6 and FIG. 11, the accumulator 13 is used to generate the addressing signal having a repetition frequency $f_0$, and the tone waveshapes TW shown in FIG. 1 and FIG. 4 are readout from the sine wave memories 2 and 22, but it is clear that this invention is not limited to a particular method for generating the tone waveshape TW, and any heretofore known method of generating a tone waveshape can be used in this invention.

Further, in the embodiments of FIG. 6 and FIG. 11, rectangular time-windows are used. In a rectangular time-window, the total time width can be effectively used for gating a sine wave, but the spectrum envelope of a rectangular time-window is widely spreaded as shown by $S_{1k}$ in FIG. 2. Especially, the spectrum intensities in the so-called side-lobe region are fairly strong for a rectangular time-window. The first zero of the spectrum intensity of a rectangular time-window is at the frequency $k/2T_0$ as shown by FIG. 2, and the spectrum envelopes beyond this frequency are called side-lobe spectrum envelopes, while the spectrum envelope within this frequency is called a main-lobe spectrum envelope. By this character of a rectangular time-window, the intensity control for a desired main-lobe spectrum envelope is accompanied by an undesired intensity change in the side-lobe spectrum envelopes, deteriorating the frequency resolution in the spectrum intensity control.

In order to eliminate this demerit, a time-window which has a sufficiently attenuated side-lobe spectrum is to be used. But it must be remembered that such a time-window with a sufficiently attenuated side lobe spectrum requires a longer time width for a same main-lobe spectrum bandwidth than a rectangular time-window does. In other words, the efficiency of the time width is decreased when the shape of a time-window is changed from a rectangular shape.

Figure 12:
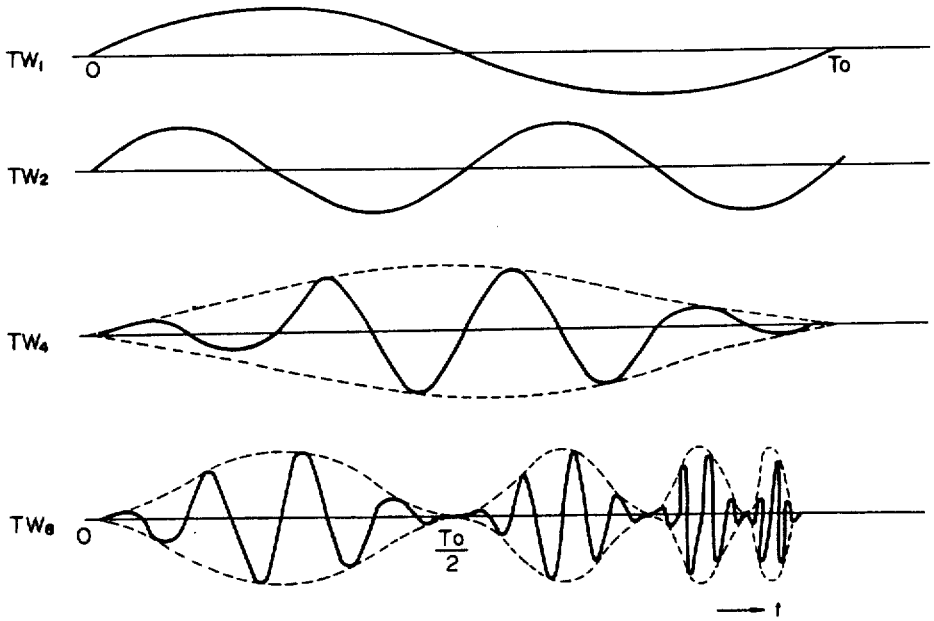
FIG. 12 shows an example of waveshapes generated in an embodiment of this invention.

FIG. 12 shows an example of waveshapes generated in an embodiment of this invention. In FIG. 12, the abscissa represents the time t, the waveshapes $TW_1$, $TW_2$ are sine waves of frequency $f_0$, $2f_0$ respectively, the waveshape $TW_4$ shows the waveshape of four complete cycles of a sine wave of frequency $4f_0$ which is passed through a Hanning time-window of time width $T_0$. The waveshape $TW_8$ shows the waveshape of four each complete cycles of sine waves of frequencies $8f_0$, $16f_0$, $32f_0$, $64f_0$ which are passed through Hanning time-windows of time widths of $T_0/2$, $T_0/4$, $T_0/8$, and $T_0 16$.

Figure 13:
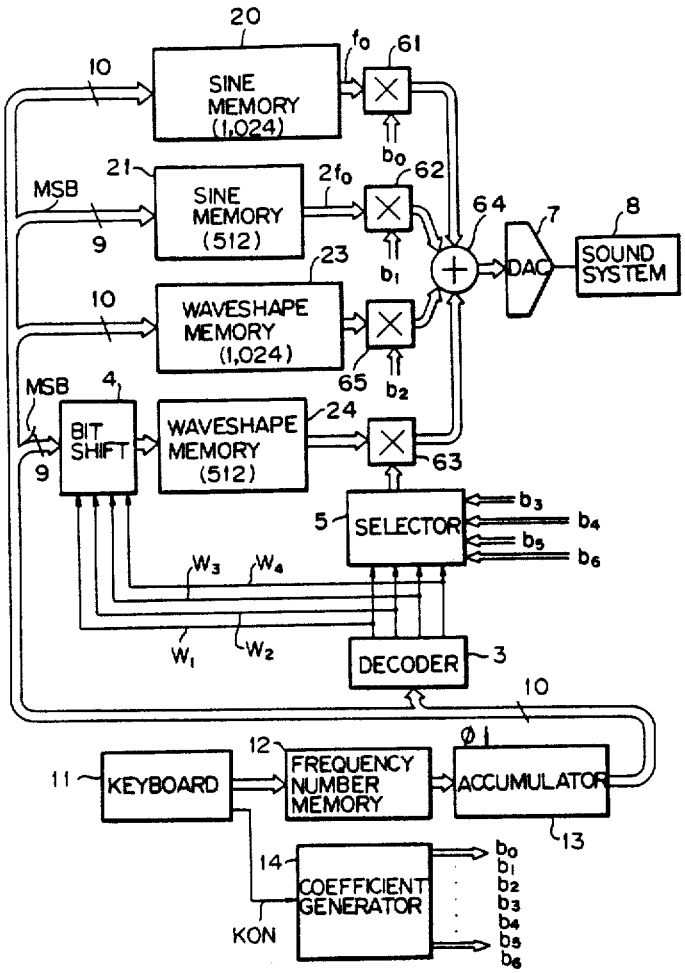
FIG. 13 is a block diagram illustrating still another embodiment of this invention.

FIG. 13 is a block diagram illustrating an embodiment of this invention to generate tone waveshapes shown by $TW_1$, $TW_2$, $TW_4$ and $TW_8$ in FIG. 12. In FIG. 13, the same numerals denote the same or the like components with FIG. 11, and will need no further description. The waveshape memory which stores the waveshape $TW_4$ of FIG. 12 in 1,024 words in represented by 23, and 24 is another waveshape memory which stores the portion from $t=0$ to $t=T_0/2$ of the waveshape $TW_8$ of FIG. 12 in 512 words. As shown by the waveshape $TW_8$, the time widths of the time-windows are changed successively to $T_0/2$, $T_0/4$, $T_0/8$, and $T_0/16$, corresponding to the time-windows $W_1$, $W_2$, $W_3$, and $W_4$ in FIG. 1 (devoid of the time-window $W_5$ of FIG. 1), and therefore the decoder 3 in FIG. 13 is devoid of the circuit corresponding to the time-windows $W_5$ and $W_6$ from the circuit shown by FIG. 7 or FIG. 8, and the internal connections of the address switching means 4 in FIG. 13 is devoid of the connections corresponding to the time-windows $W_5$ and $W_6$ from the connections shown by FIG. 9. It will be apparent that the tone waveshapes $TW_1$, $TW_2$, $TW_4$, and $TW_8$ in FIG. 12 are respectively readout from the sine wave memories 20, 21, and the waveshape memories 23, 24 in FIG. 13. The waveshapes $TW_4$ and $TW_8$ can be considered as the waveshapes which are produced when pure sine waves are passed through the corresponding Hanning time-windows, and therefore, the spectrum envelopes for these waveshapes can be calculated from the convolution of the spectrum envelope of the Hanning time-window and the line spectrum of the corresponding pure sine wave. The total time width of the time-windows of the tone waveshapes $TW_4$ and $TW_8$ in FIG. 12 is twice as long as the total time width of the time-windows for the tone waveshape TW in FIG. 1, and the shape of the time-windows in FIG. 12 can be considered as Hanning windows as shown by the dotted lines in $TW_4$ and $TW_8$. It will be clear from the Fourier analysis of a Hanning window that the side-lobe spectrum which was fairly strong for a rectangular time-window as shown by $S_{1k}$ in FIG. 2, is sufficiently attenuated for a Hanning window and that the bandwidth of the main-lobe spectrum envelope for the Hanning window in FIG. 12 is the same with that for the rectangular window in FIG. 1, since the time width of the Hanning window in FIG. 12 is twice as wide as the time width of the rectangular window in FIG. 1.

The output of the sine wave memories 20, 21 are amplitude-controlled by the corresponding coefficients at the multipliers 61, 62 as described in connection with FIG. 11, the output of the waveshape memory 23 (the tone waveshape $TW_4$ of FIG. 12) is amplitude-controlled at the multiplier 65 by the coefficient $b_2$, and the output of the waveshape memory 24 (the tone waveshape $TW_8$ of FIG. 12) is amplitude-controlled at the multiplier 63 by the corresponding coefficients $b_3 \sim b_6$. Therefore, each spectrum envelope which can be independently controlled by any of these coefficients $b_2 \sim b_6$ in the circuit of FIG. 13 has more sufficiently attenuated side-lobe spectrum envelope than the corresponding spectrum envelope which can be independently controlled by the corresponding one of the coefficients $b_2 \sim b_6$ in the circuit of FIG. 11. In this meaning, it can be said that the embodiment shown in FIG. 13 has a better frequency resolution in the control of the spectrum intensities.

From the comparison between FIG. 6 and FIG. 11, and that between FIG. 11 and FIG. 13, it will be understood that the time width of a time-window must be increased to increase the frequency resolution in the control of spectrum intensities, that a rectangular window must be avoided to suppress the side-lobe spectrum envelopes which are detrimental to the frequency resolution, and that the number of the parallel operating waveshape memories (in general, the parallel operating waveshape generators must be increased to increase the frequency resolution in the control of the spectrum intensities.

Figure 14:
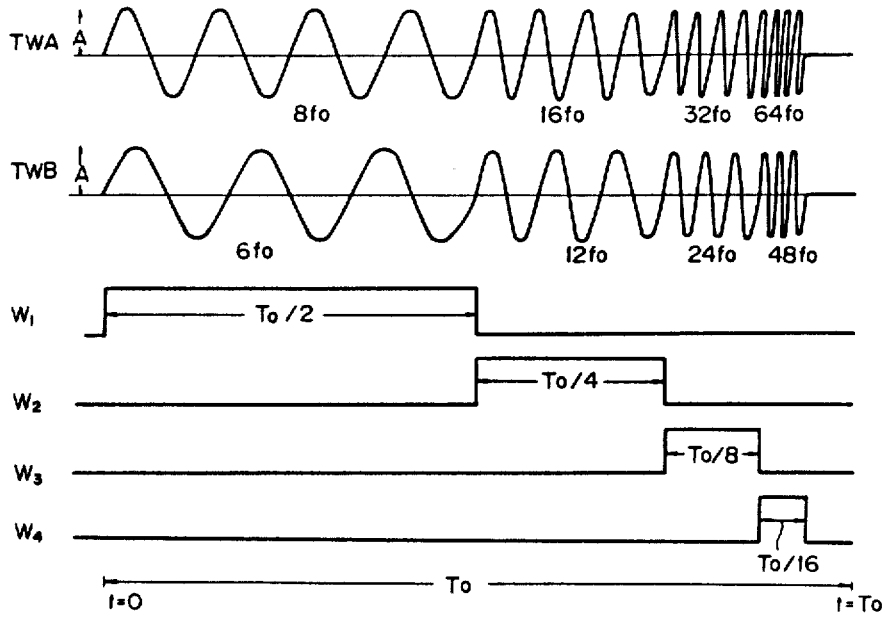
FIG. 14 shows another example of waveshapes generated in another embodiment of this invention.

FIG. 14 shows another example of waveshapes generated in another embodiment of this invention. In FIG. 14, the same notations with FIG. 1 have the same meanings, and TWA shows a tone waveshape which will hereafter be called as series A, while TWB shows another tone waveshape which will hereafter be called as series B. When FIG. 14 is compared with FIG. 1, it will be apparent that the ratio of the time width of each time-window to the period of the corresponding sine wave of TWA in FIG. 14 is two times that of TW in FIG. 1, and the ratio of the time width of each time-window to the period of the corresponding sine wave of TWB in FIG. 14 is one and half times that of TW in FIG. 1. Therefore the bandwidths of the spectrum envelopes for the tone waveshapes TWA and TWB will become respectively one half and two thirds of the bandwidths of the spectrum envelopes shown as $S_8$, $S_{16}$, $S_{32}$, and $S_{64}$ in FIG. 3.

Figure 15:
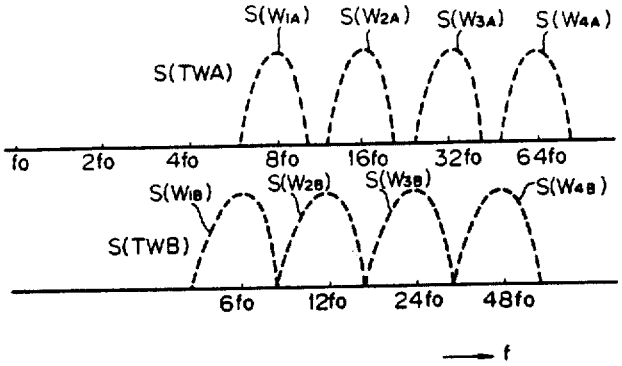
FIG. 15 is a spectrum diagram illustrating the spectrum envelope of the waveshapes shown in FIG. 14.

FIG. 15 is a spectrum diagram illustrating the spectrum envelopes for the tone waveshapes shown by TWA and TWB in FIG. 14. This spectrum diagram of FIG. 15 is represented with the 6db/octave attenuation compensated as described in connection with FIG. 5. S(TWA) and S(TWB) are the spectrum envelopes for the tone waveshapes TWA and TWB respectively, and $S(W_{1A})\sim S(W_{4A})$ of S(TWA) and $S(W_{1b})\sim S(W_{4B})$ of S(TWB) show the spectrum envelopes for the tone waveshapes which pass the time-windows $W_1\sim W_4$ of FIG. 14 respectively.

When FIG. 15 is compared with FIG. 3, it will be apparent that the tone waveshapes TWA and TWB have narrower frequency bands of the spectrum envelopes which increase the resolution in the spectrum control, but which give rise to spectrum void regions where spectrum intensities are very weak as shown by S(TWA) or S(TWB) in FIG. 15. Therefore, both tone waveshapes TWA and TWB in FIG. 14 are simultaneously generated to eliminate these spectrum void regions throughout the whole frequency region. Further, as shown in FIG. 15, the frequency components at frequencies $f_0$, $2f_0$, $3f_0$, and $4f_0$ are not included in either one of the spectrum envelopes S(TWA) and S(TWB), and these frequency components must be generated by other circuits.

Figure 16:
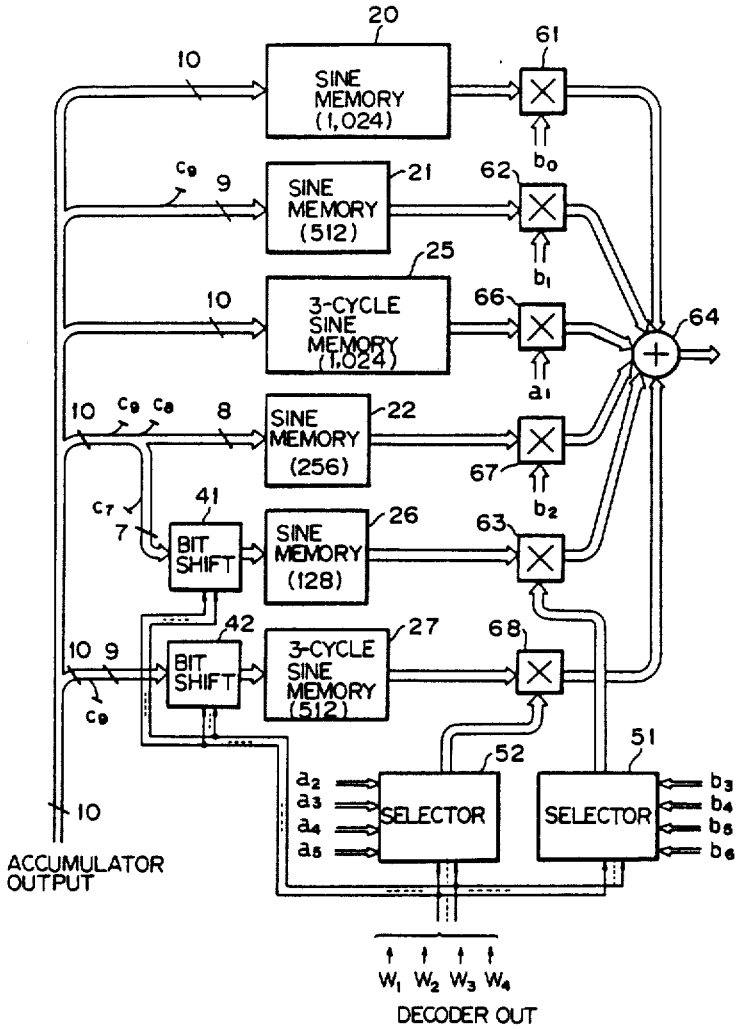
FIG. 16 is a block diagram illustrating still another embodiment of this invention.

FIG. 16 is a block diagram illustrating still another embodiment of this invention, and the same numerals with FIG. 11 show the same or the like components which will need no further explanations. And in FIG. 16, the circuits after the output of the adder 64 are not shown in the drawing, since these circuits are the same with the corresponding circuits in FIG. 11.

Further, the keyboard 11, the frequency number memory 12, the accumulator 13 shown in FIG. 11 and the decoder 3 shown in FIG. 13 are also provided in the circuit of FIG. 16, but these components are not shown in FIG. 16 for brevity of the drawing, and only the transmission lines for the accumulator output and the decoder output $W_1$, $W_2$, $W_3$, $W_4$ are indicated. The circuit of FIG. 16 has a coefficient generator corresponding to the coefficient generator 14 in FIG. 11, and the coefficient generator in FIG. 16 (not shown in the drawing) generates 12 coefficients $b_0\sim b_6$ and $a_1\sim a_5$. The transmission lines for these coefficients are shown in FIG. 16.

And 25 in FIG. 16 is a memory of 3 periods of a sine wave which stores the 3 periods in 1,024 words, 26 is a sine wave memory of 128 words, 27 is an another memory of 3 periods of a sine wave which stores the 3 periods in 512 words, and 66, 67, and 68 are multipliers respectively.

In the circuit of FIG. 16, there are also provided a selector 51 for series A, a selector 52 for series B, bit shifter 41 for series A, and bit shifter 42 for series B in order to produce both tone waveshapes TWA and TWB simultaneously. The function of the selector 51 or 52 is the same with that of the selector 5 in FIG. 13, and the internal connection of the bit shifter 42 is the same with that of the bit shifter 4 in FIG. 13. The bit shifter 41 has a similar connection with that of the bit shifter 42, but is devoid of the circuits related to the input bits $c_8$, $c_7$ and the output bits $a_8$, $a_7$, since the storage capacity of the sine wave memory 26 is 128 words.

In the same way as described in connection with FIG. 11 and FIG. 13, sine waves of frequencies $f_0$, $2f_0$, $3f_0$, and $4f_0$ are generated respectively from the sine wave memories 20, 21, the memory of 3 periods of a sine wave 25, and the sine wave memory 22; and the tone waveshapes TWA and TWB in FIG. 14 are generated respectively from the sine wave memory 26 and the memory of 3 periods of a sine wave 27.

The sine waves of frequencies $f_0$, $2f_0$, $3f_0$, and $4f_0$ are independently amplitude-controlled at the multipliers 61, 62, 66, and 67 by the coefficients $b_0$, $b_1$, $a_1$, and $b_2$. The frequency components in the spectrum envelopes $S(W_{1A})\sim S(W_{4A})$ in FIG. 15 are independently amplitude-controlled at the multiplier 63 by the coefficients $b_3\sim b_6$ respectively, and the frequency components in the spectrum envelopes $S(W_{1B})\sim S(W_{4B})$ in FIG. 15 are independently amplitude-controlled at the multiplier 68 by the coefficients $a_2\sim a_5$ respectively.

When FIG. 15 is compared with FIG. 3 or FIG. 5, it will be said that, in the embodiment shown by FIG. 16, the frequency resolution in the spectrum control is substantially improved.

In all embodiments heretofore shown, the time width of any of the time-windows is equal to one part of the fundamental period $T_0$ divided by a predetermined integer, and the ratio of the period of the sine wave which passes the time-window to the period $T_0$ is also maintained at an integer. But, in general, the time width of any of the time-windows and the period of the sine wave which passes the sine wave can be determined independently from the period $T_0$.

For example, when the time width of a time-window is $2T_W/k$ where $T_w$ is arbitrary provided with $T_W<T_0$, the frequency of the sine wave which passes the time-window of $2T_W/k$ width is $k/T_W$, and k=4, 8, 16, 32, and 64 maintaining the relation $T_0>(2T_W/4+2T_W/8+2T_W16+2T_W/32+2T_W/64)$, it will be clear that a tone waveshape which is similar to the tone waveshape TW in FIG. 1 is generated. And it is apparent that the spectrum envelope which is obtained by the Fourier analysis of this tone waveshape contains only line spectra which are integral multiples of the frequency $f_0=1/T_0$, because the repetition period of this tone waveshape is $T_0$ regardless of the value of $T_W$.

Figure 17:
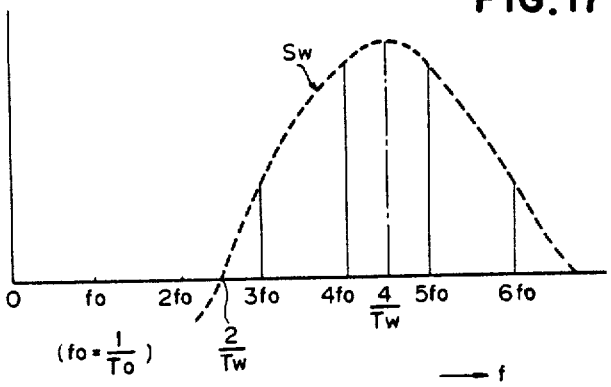
FIG. 17 shows an example of the relation between the line spectra and the spectrum envelope in an embodiment of this invention.

FIG. 17 shows an example of the relation between the line spectra and the spectrum envelope in an embodiment of this invention, and there are shown the spectrum envelope $S_W$ and the line spectra when a sine wave $A\sin 4(2\pi/T_W)t$ is passed through a rectangular window having $2T_W/4$ time width with a repetition period $T_0$ where $T_W>T_0$. In FIG. 17, the abscissa is the frequency f, and the spectrum envelope $S_W$ has its peak at the frequency $f=4/T_W$ as will be easily understood from the descriptions in connection with FIG. 2, while all the frequency components included are the harmonics for the frequency $f_0=1/T_0$ as shown by $3f_0$, $4f_0$, $5f_0$, $6f_0$, . . . in FIG. 17.

The example of the spectrum envelope $S_W$ shown in FIG. 17 corresponds to the spectrum envelope $S_4$ shown in FIG. 3. It will be clear that other spectrum envelopes corresponding to the spectrum envelopes corresponding to the spectrum envelopes $S_8 \sim S_{64}$ in FIG. 3 may also be produced and that the shapes of these produced spectrum envelopes are determined by the time widths $2T_W/k$, while the line spectra included in these spectrum envelopes are all the harmonics of the frequency $f_0=1/T_0$.

Figure 18:
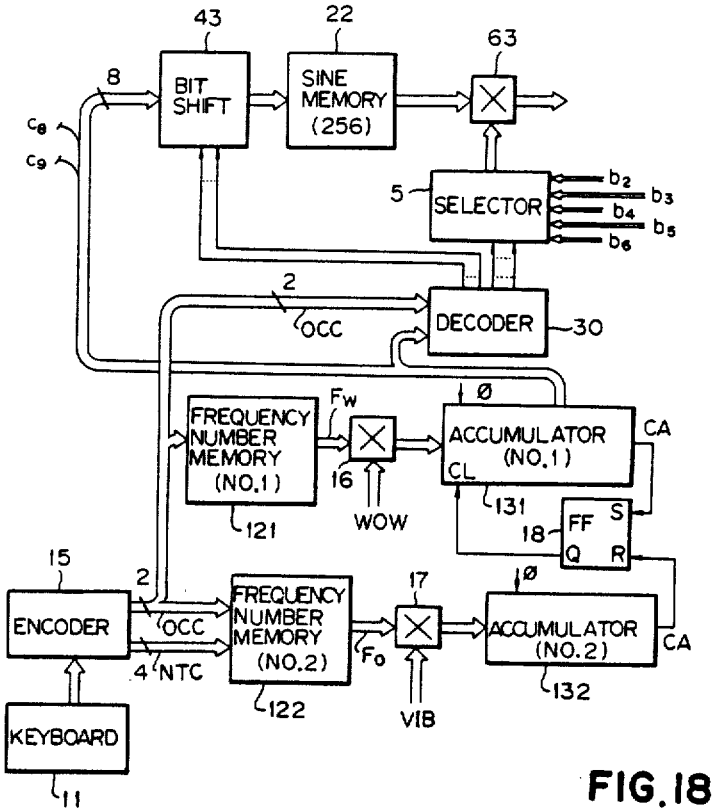
FIG. 18 is a block diagram illustrating still another embodiment of this invention.
Figure 19:
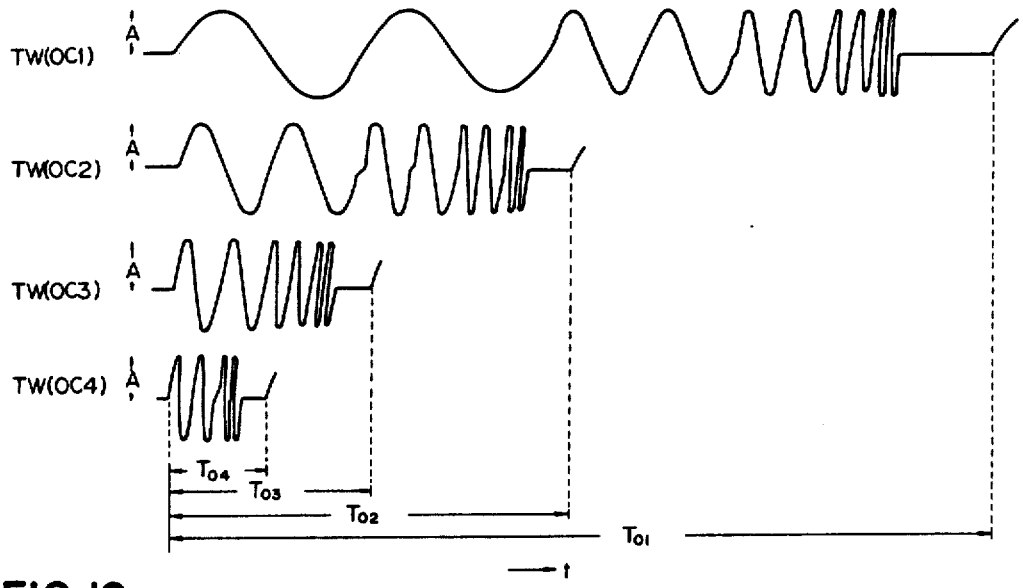
FIG. 19 shows an example of waveshapes generated by the embodiment shown in FIG. 18.

FIG. 18 is a block diagram illustrating still another embodiment of this invention, and FIG. 19 shows an example of waveshapes generated by the embodiment shown by FIG. 18.

In the embodiment shown by FIG. 18, it is assumed that a bit shifter 43 addresses the sine wave memory 22 to readout a same tone waveshape in a same octave, and changes the addressing to readout different tone waveshapes for different octaves are shown in FIG. 19. The repetition frequency of any of these tone waveshapes is always coincident with the frequency $f_0$, and the start point of the tone waveshape is controlled to coincide with a predetermined phase point of the period $T_0$.

It is also assumed that, in the embodiment of FIG. 18, the musical tones are generated in a range of 4 octaves, that is, the octave No. 1(OC1), the octave No. 2(OC2), the octave No. 3(OC3), and the octave No. 4(OC4). The tone waveshapes readout from the sine wave memory 22 in the 4 different octaves are shown in FIG. 19 by TW(OC1), TW(OC2), TW(OC3), and TW(OC4) respectively. In FIG. 19, the abscissa represents the time t and the ordinate represents the amplitude A. The musical tone frequencies corresponding to these 4 tone waveshapes TW(OC1)~TW(OC4) are denoted respectively by $T_{01} \sim T_{04}$ in FIG. 19. This embodiment of FIG. 18 is characterized in that, when the musical tone frequency is changed in a same octave (that is, when the time width of any one of $T_{01} \sim T_{04}$ is changed), the corresponding tone waveshape of the waveshapes TW(OC1)~TW(OC4) remains unchanged.

In all these tone waveshapes TW(OC1)~TW(OC4) in FIG. 19, the highest frequency of the sine waves which pass the time-windows remains constant. This means that the highest frequency component included in the spectrum envelopes corresponding to the tone waveshapes TW(OC1)~TW(OC4) is the same, the spectrum envelope for the tone waveshape TW(OC1) corresponding to the spectrum envelope $S_4 \sim S_{64}$ in FIG. 3, the spectrum envelopes for the tone waveshapes TW(OC2), TW(OC3), and TW(OC4) respectively corresponding to spectrum envelopes $S_8 \sim S_{64}$, $S_{16} \sim S_{64}$, and $S_{32} \sim S_{64}$ in FIG. 3. The frequency components which have frequencies higher than the spectrum envelope $S_{64}$ in FIG. 3 are inaudible and have little influence on the tone quality. Therefore, the tone waveshapes are changed for different octaves as shown in FIG. 19 in order to simplify the waveshape generation circuit.

In FIG. 18, the same numerals with FIG. 11 show the same or the like components, and 15 is an encoder which receives the information of the tone frequency assigned to the key depressed on the keyboard 11 and generates the octave code OCC for indicating the octave to which the tone frequency belongs and the note code NTC for indicating the name of the note of the tone frequency. The octave code OCC is composed of 2 bits for indicating the desired one of the 4 kinds of octaves OC1~OC4 which are previously described, and the note code NTC is composed of 4 bits for indicating the desired one of the 12 different names of the note. The numerals 121 and 122 are frequency number memory No. 1 and frequency number memory No. 2 respectively. Each of these frequency number memories 121 and 122 corresponds to the frequency number memory 12 in FIG. 11, the frequency number memory 121 receiving the octave code OCC from the encoder 15 for producing the value $F_W$ corresponding to the input OCC, and the frequency memory 122 receiving the octave code OCC and the note code NTC for producing the value $F_0$ which is the same with the output $F_0$ of the frequency number memory 12 of FIG. 11. The numerals 16 and 17 respectively denote multipliers which will be described in later paragraphs. When both the multiplier inputs as indicated by WOW and VIB in FIG. 18 are unity, the outputs of these multipliers 16 and 17 are respectively $F_W$ and $F_0$. Two accumulators, each corresponding to the accumulator 13 of FIG. 11, are provided, 131 being accumulator No. 1 and 132 being accumulator No. 2. The accumulator 131 accumulates the value $F_W$ at the clock frequency $\phi$ and the 8 bits ($c_7 \sim c_0$) of this accumulator 131 address the sine wave memory 22 through the address switching means 43. A set-reset type flipflop is denoted by 18. The accumulator 132 generates a carry pulse CA which has the musical tone frequency in a same way as the accumulator 13 in FIG. 6, and this carry pulse CA clears the accumulator 131 through the flipflop 18. Thus, the address from the accumulator 131 to readout the sine wave memory 22 changes in synchronism with the carry pulse CA, and therefore, the start points of the waveshapes TW(OC1)~TW(OC4) are synchronized with the start points of the corresponding musical tone periods $T_{01} \sim T_{04}$ as shown in FIG. 19. The decoder 30 in FIG. 18 corresponds to the decoder 3 in FIG. 11, and the bit shifter 43 in FIG. 18 corresponds to the bit shifter 4 in FIG. 11.

Further, in the circuit of FIG. 18, there are provided the coefficient generator 14, the sine wave memories 20 and 21, the multipliers 61 and 62, the adder 64, the DAC 7, and the sound system 8 in the same way as shown in FIG. 11, although these components are not shown in FIG. 18 for the sake of the brevity of the drawing, the sine wave memories 20 and 21 (not shown in FIG. 18) are addressed by the output of the accumulator 132.

Figure 20:
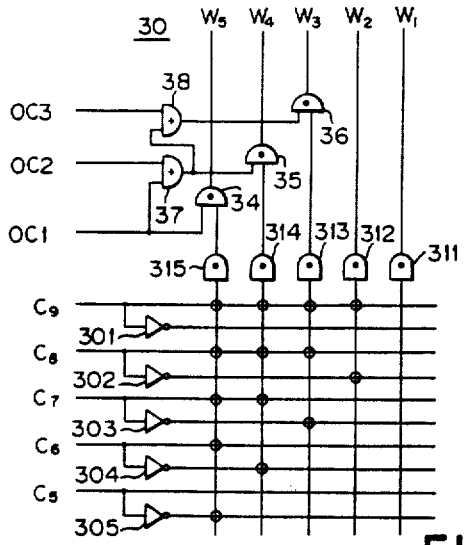
FIG. 20 is a circuit diagram illustrating an example of the decoder shown in FIG. 18.

FIG. 20 is a circuit diagram illustrating an example of the decoder 30 shown in FIG. 18. In FIG. 20, the same numerals with FIG. 7 show the same or the like components, the same notations have the same meanings, and there are also provided AND gates 34, 35, 36, and OR gates 37, 38. As in FIG. 7, the decoder 30 receives the higher 5 bits ($c_9 \sim c_5$) from the output of the accumulator 131, and transmitts the time-window $W_1 \sim W_5$ from the AND gates 311~315. But in the decoder 30, the 2 bits of the octave code OCC are decoded to signals OC1~OC3 which represent the octaves, and in accordance with the octave, the time-windows $W_1 \sim W_5$, $W_1 \sim W_4$, $W_1 \sim W_3$, or $W_1$ and $W_2$ are transmitted through the OR gates 34, 35, and 36. The output frequency of the accumulator 131 becomes higher as the octave is raised, resulting in a narrower time width of a time-window. For example, the time width of the timewindow $W_1$ in the octave OC4 is equal to that of the time-window $W_4$ in the octave OC1.

The internal connection of the bit shifter 43 is the same with that of the bit shifter 4 in FIG. 11, provided that the switchings in the bit shifter 43 are only among the time-windows which are received from the decoder 30, since the number of the time-windows which are transmitted from the decoder 30 changes in accordance with the octave as shown by FIG. 19.

Thus, one of the tone waveshapes selected in accordance with the octave code OCC from TW(OC1)~TW(OC4) shown in FIG. 19 are readout from the sine wave memory 22. The selector 5 in FIG. 18 is the same with the selector 5 in FIG. 11, provided that only the coefficients corresponding to the time-windows which are received from the decoder 30 are transmitted to control the amplitudes of the corresponding waveshapes of the waveshapes TW(OC1)~TW(OC4) in FIG. 19 at the multiplier 63, since the number of the time-windows which are transmitted from the decoder 30 changes in accordance with the octave.

Accordingly, the spectrum envelope of the tone waveshape readout from the sine wave memory 22 of FIG. 18 in the octave OC1 will become equivalent to the spectrum envelope $S_4$, $S_8$, $S_{16}$, $S_{32}$, and $S_{64}$ of FIG. 3, and the fundamental tone frequency changes in the range of one octave with the frequency $f_O$ of FIG. 3 as the highest limit of the fundamental tone frequency; in the octave OC2, the spectrum envelope will become equivalent to the spectrum envelope $S_8$, $S_{16}$, $S_{32}$, and $S_{64}$ of FIG. 3, the fundamental tone frequency changes in the range $2f_O \sim f_O$; in the octave OC3, the spectrum envelope will become equivalent to the spectrum envelope $S_{16}$, $S_{32}$, and $S_{64}$ of FIG. 3, and the fundamental tone frequency changes in the range $4f_O 2f_O$; and in the octave OC4, the spectrum envelope will become equivalent to the spectrum envelope $S_{32}$ and $S_{64}$ of FIG. 3, and the fundamental tone frequency changes in the range $8f_O 4f_O$.

At the multiplier 63, each sine wave is independently amplitude-controlled by the corresponding one of the coefficients $b_2 \sim b_6$. This means that, in the octave OC1, each part $S_4 \sim S_{64}$ of the spectrum envelope of FIG. 3 is amplitude-controlled by the corresponding coefficient $b_2 \sim b_6$; in the octave OC2, each part $S_8 \sim S_{64}$ of the spectrum envelope of FIG. 3 is ampltiude-controlled by the corresponding coefficient $b_3 \sim b_6$; in the octave OC3, each part $S_{16} \sim S_{64}$ of the spectrum envelope of FIG. 3 is amplitude-controlled by the corresponding coefficient $b_4 \sim b_6$; and in the octave OC4, each part $S_{32}$, $S_{64}$ of the spectrum envelope of FIG. 3 is amplitude controlled by the coefficient $b_5$ or $b_6$.

It will be easily understood from the relation between the spectrum envelope $S_W$ and the line spectra in FIG. 17 that a vibrato effect or wow-wow effect which accompany the spectrum variation can be obtained by giving a small variation to the frequency $f_W = 1/T_W$ and/or $f_O = 1/T_O$.

The multiplier 16 in FIG. 18 multiplies the value $F_W$ by a coefficient (the coefficient shown by WOW in the drawing) which changes as a function of time by a small amount around the center value of unity, and this multiplication changes the frequency $f_W$ by a small amount around the center frequency, resulting in the lateral shift (shaft along the frequency axis) of the spectrum envelope $S_W$ of FIG. 17. When the output of the multiplier 17 is fixed during the variation of the output of the multiplier 16, the lateral positions (positions on the frequency axis) of the line spectra do not change in the changing spectrum envelope $S_W$, and therefore, a wow-wow effect is obtained in which the relative intensities of the line spectra are changed.

The multiplier 17 of FIG. 18 multiplies the value $F_O$ with a coefficient (the coefficient shown by VIB in the drawing) which changes as a function of time by a small amount around the center value of unity, and this multiplication changes the frequencey $f_O$ by a small amount around the center frequency. When the output of the multiplier 16 is fixed during the variation of the output of the multiplier 16, the lateral positions of the line spectra are changed in the fixed spectrum envelope $S_W$ in FIG. 17, and a vibrato effect is obtained.

It has been described that the frequency number memory 121 stores the values of $F_W$ for all the octaves, but it will be apparent that only the value of $F_W$ for the lowest octave (OC1) is stored in the memory 121 and the values of $F_W$ for higher octaves may be produced by shifting the bits or a bit of the value of $F_W$ for the octave OC1. In this case the memory 121 will become very simple when the value of $F_W = 1.0$ is stored in the memory. Further the memory 121 and the multiplier can be combined as an arithmetic circuit for operating the calculation $(1+\Delta)$. $(\text{oct}-1)$, where $\Delta$ is a WOW coefficient and oct is the number representing the order of the octave.

In all the embodiments heretofore described, sine waves are passed through time-windows to generate tone waveshapes, but it will be apparent that this invention is not limited to a particular method for generating tone waveshapes.

Further, in all the embodiments heretofore described, the frequency of the sine wave passing through time-windows is changed by stepwise; but it will be clear that a similar effect can be obtained by gradually changing the sine wave frequency.

Figure 21:
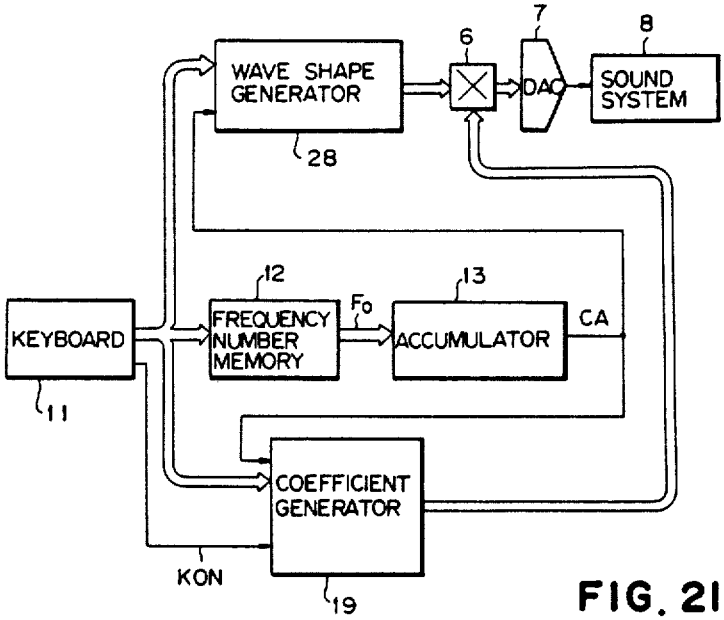
FIG. 21 is a block diagram illustrating still another embodiment of this invention.

FIG. 21 is a block diagram illustrating still another embodiment of this invention, and the same numerals with FIG. 6 represent the same or the like components which need no further descriptions. The waveshape generator 28 in FIG. 21 generates a sine wave of a gradually changing frequency with the start point synchronized by the carry pulse CA from the accumulator 13. This sine wave of gradually changing frequency is terminated before the succeeding carry pulse CA.

The coefficient generator in FIG. 21 is denoted by 19, which generates a gradually changing coefficient (corresponding to the coefficients $b_1 \sim b_6$ of FIG. 6) synchronized with the change of the sine wave frequency from the waveshape generator 28 and cyclically repeated with the frequency of the carry pulse CA in the whole duration of the KON signal.

The circuit to generate a sine wave of a gradually changing frequency is well known in the technological field of the frequency modulation in a communication equipment or of the frequency sweep in a signal generator equipment. Any of these heretofore known circuits can be used as the waveshape generator 28 of FIG. 21.

Figure 22:
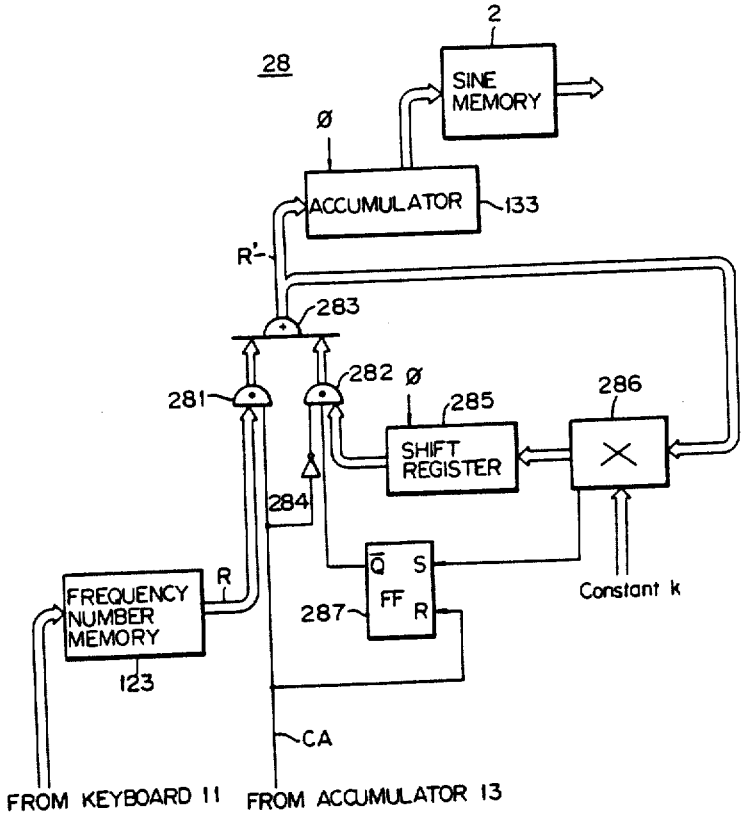
FIG. 22 is a block diagram illustrating an example of the waveshape generator shown in FIG. 21.

FIG. 22 is a block diagram illustrating an example of the waveshape generator 28 shown in FIG. 21. The sine wave memory 2 in FIG. 22 is the same with the sine wave memory 2 in FIG. 6, and 123 is a frequency number memory corresponding to the frequency number memory 121 of FIGS. 18, 281 and 282 are respectively AND gates, 283 is an OR gate, 284 is an inverter, 285 is a shift register, 286 is a multiplier, and 287 is a flipflop.

The value R corresponding to the pitch of the musical tone assigned to the key which is depressed at the keyboard 11, is readout from the frequency number memory 123 and are accumulated in the accumulator 133 through the AND gate 281 and the OR gate 283. But the value R is added to the accumulator 133 only when the carry pulse CA is transmitted from the accumulator 13 (FIG. 21) to the AND gate 281. In other times, the value of R' which is circulated from the output of the OR gate 283, through the multiplier 286, the shift register 285, the AND gate 282 to the input of the OR gate 283, and which is multiplied by a constant k at the multiplier 286 for each one circulation, is accumulated in the accumulator 133. Thus, the value of R' is increased exponentially and the frequency of the sine wave readout from the sine wave memory 2 addressed by the higher bits of the accumulator 133 is increased exponentially.

The flipflop 287 is set by the carry pulse from the multiplier 286 and is reset by the carry pulse CA from the accumulator 13, in order to synchronize the start point of the waveshape readout from the sine wave memory 2 with a predetermined phase of the musical tone and terminate the waveshape within the period of the musical tone.

Figure 23:
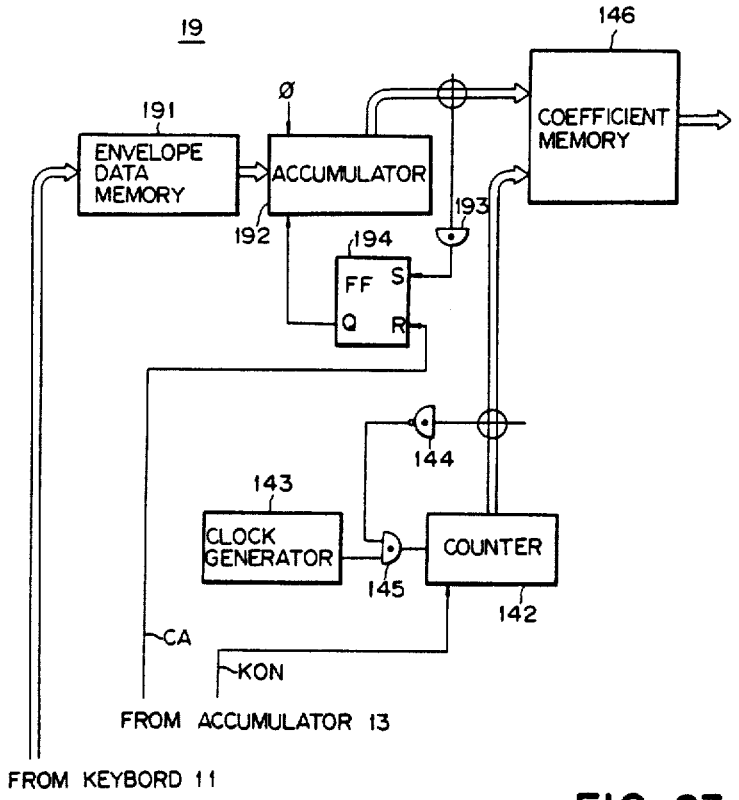
FIG. 23 is a block diagram illustrating an example of the coefficient generator shown in FIG. 21.

FIG. 23 is a block diagram illustrating an example of the coefficient generator 19 in FIG. 21, and the same numerals with FIG. 10 represent the same or the like components which will need no further descriptions. The coefficient memory which corresponds to the coefficient memory 140 in FIG. 10 is denoted by 146 in FIG. 23, and 191 is an envelope number memory, 192 is an accumulator, 193 is an AND gate, and 194 is a set-reset type flipflop.

While the coefficients $b_1 \sim b_6$ are generated in parallel from the coefficient generator 14 of FIG. 10, the coefficient readout from the coefficient generator 19 in FIG. 21, gradually changes in synchronism with the change of the sine wave frequency readout from the waveshape generator 28. Thus, the coefficient memory 146 of FIG. 23 is addressed by the counter 142 in a same way as the coefficient memory 140 of FIG. 10 is addressed by the counter 142, and the coefficient memory 146 is also addressed by the contents of the accumulator 192 which changes in synchronism with the change in the output frequency of the waveshape generator 28. The AND gate 193 sets the flipflop 194 when all bits of the accumulator 192 are at logic "1", and the carry pulse CA from the accumulator 13 resets the flipflop 194, and thereby the coefficient, which changes in synchronism with the change of the output frequency of the waveshape generator 28 and which also changes as a function of time from the start point of the KON signal, is readout from the coefficient memory 142. The output from the envelope number memory 191 is a digital value corresponding to the pitch of the musical tone assigned to the key depressed at the keyboard 11, and this output is accumulated in the accumulator 192. The relation between the output from the envelope number memory 191 and the digital value R from the frequency number memory 123 of FIG. 22 keeps the predetermined relation beteen the change of the coefficient generated from the coefficient generator 19 and the change of the output frequency from the waveshape generator 28.

As the spectrum envelope of a sine wave with a gradually changing frequency is well known in the field of the spectrum analysis of a frequency modulated signal, detailed descriptions are abbreviated. But it will be easily understood that the gradual change in the frequency is more advantageous for the suppression of undesired harmonic components which are generated by an abrupt change in the frequency.

Although the foregoing descriptions of this invention have been on several particular embodiments, this invention is not limited to these particular embodiments and many modifications can be made without departing from the scope and spirit of this invention to provide a musical instrument in which the spectrum envelope can be independently controlled by a simple circuit.

What is claimed is:

1. An electronic musical instrument comprising:

means for repeatedly generating a waveshape having a frequency which changes as a function of time from the start point of said waveshape, said start point of said waveshape being synchronized with a predetermined phase point of the fundamental period of a musical tone to be generated and said waveshape being terminated within a period of said fundamental period of said musical tone;

an amplitude control means for controlling the amplitude of said waveshape in correspondence with said frequency changing as a function of time within said fundamental period; and a sound system means for producing a musical tone from the output of said amplitude control means.

2. An electronic musical instrument according to claim 1 wherein said means for repeatedly generating a waveshape generates a constant amplitude sine wave, the frequency of said sine wave having a harmonic relation with the fundamental frequency of said musical tone, and the frequency ratio in said harmonic relation being changed at predetermined time points in the progress of time from said start point of said waveshape within said fundamental period.

3. An electronic musical instrument according to claim 1 wherein said means for repeatedly generating a waveshape generates an amplitude modulated sine wave, the frequency of said sine wave having a harmonic relation with the fundamental frequency of said musical tone, and the frequency ratio in said harmonic relation being changed at predetermined time points in the progress of time from said start point of said waveshape within said fundamental period.

4. An electronic musical instrument according to claim 1 wherein said means for repeatedly generating a waveshape is provided with parallel operating waveshape generators, and each one waveshape generator generates a waveshape which is assigned to said waveshape generator, the start point of said assigned waveshape being synchronized with a predetermined phase point of the fundamental period of a musical tone to be generated and said waveshape being terminated within a period of said fundamental period of said musical tone.

5. An electronic musical instrument according to claim 1 wherein said means for repeatedly generating a waveshape generates a waveshape which is a predetermined time function in the progress of time from said start point of said waveshape, the shape of said predetermined time function being unchanged in a predetermined range of the changes of said fundamental frequency of a musical tone to be generated.

6. An electronic musical instrument for producing a musical tone having a fundamental with a period To, comprising:

time-window generation means for producing a consecutive set of time-window signals each establishing a respective time interval which is a different fractional portion of said fundamental period To, first sine wave generation means, cooperating with said time-window generation means, for generating during each respective established time interval a sine wave signal having a frequency that is a different harmonic of said fundamental, coefficient generation means, cooperating with said time-window generation means and said sine wave generation means, for respectively independently scaling said generated sine wave signals by a separate coefficient for each time interval, and sound conversion means for converting said scaled sine wave signals to a musical tone.

7. An electronic musical instrument according to claim 6 wherein said time-window generation means produces time window signals establishing respective time intervals which are different integral fractional portions of said fundamental period To, and wherein said first sine wave generation means generates sine wave signals each having a frequency that is harmonically related to said fundamental in accordance with the inverse of said integral fraction of the corresponding time interval.

8. An electronic musical instrument according to claim 6 further comprising:

second sine wave generation means, also cooperating with said time-window generation means, for generating during each of said established time intervals a second sine wave signal having a frequency which is a different harmonic of said fundamental from the harmonic generated by said first sine wave generation means during the same established time interval, said second sine wave signals also being scaled and combined with said scaled sine wave signals from said first sine wave generator for use by said sound conversion means.

9. A digital electronic musical instrument comprising:

accumulator means for repetitively accumulating with a fixed modulus at a set clock rate a selected frequency number related to the fundamental frequency of a musical tone, a wave shape memory storing sampled amplitudes of a sine wave, decoder means, responsive to the contents of said accumulator, for producing a set of time interval control signals respectively establishing time intervals that are different fractional portions of the period of said fundamental frequency, bit shift circuitry, cooperating with said decoder means, for causing the contents of said waveshape memory to be accessed using as sample point specifying addresses different subsets of said accumulator contents in accordance with the value of said time interval control signals, and digital-to-analog conversion means for converting the accessed sampled amplitudes from said waveshape memory to musical tones.

10. A digital electronic musical instrument according to claim 9 further comprising:

coefficient generator means for providing a set of amplitude scale factors, selector means, cooperating with said decoder means, for selecting a scale factor from said set in accordance with the value of said time interval control signals, and scaler means, cooperating with said waveshape memory, for scaling the accessed sampled amplitudes from said waveshape memory by the selected scale factor and providing the resultant scaled amplitudes to said conversion means.

11. An electronic musical instrument according to claim 10 wherein said coefficient generator means provides successively different sets of ampltiude scale factors as a function of time from initiation of musical tone production.

12. An electronic musical instrument according to claim 9 further comprising:

at least one additional sine waveform memory means, accessed by directly using a subset of the accumulator contents as the sample point specifying addresses, for producing at least a fundamental frequency sine wave continuously throughout all of said established time intervals, said continuously produced sine wave being combined with the accessed sampled amplitudes from said waveshape memory for input to said conversion means.

13. An electronic musical instrument according to claim 12 further comprising:

another additional sine waveform memory means for producing a sine wave at twice the fundamental frequency continuously throughout all of said established time intervals, which sine wave also is combined with said accessed sampled amplitudes for input to said conversion means.

14. An electronic musical instrument according to claim 9 wherein said waveshape memory stores sampled amplitudes of a sine wave which is amplitude modified to gradually increase and then decrease in envelope amplitude through one or more sine wave periods, said accessed sampled amplitudes thereby constituting a Hanning time-window modulated sine wave signal.

15. A digital electronic musical instrument comprising:

accumulator means for accumulating with a fixed modulus a selected frequency number related to the octave of a musical tone, said accumulating being repetitively initiated in synchronism with the fundamental period of said musical tone, a waveshape memory storing sampled amplitudes of a sine wave, decoder means, responsive to the contents of said accumulator and to said musical tone octave for producing a set of time interval control signals respectively establishing time intervals that are different fractional portions of the period of said fundamental frequency, there being fewer of such established time intervals for musical tones of progressively higher octave, bit shift circuitry means, cooperating with said decoder means, for causing the contents of said waveshape memory to be accessed using as sample point specifying addresses different subsets of said accumulator contents in accordance with the value of said time interval control signals, and digital-to-analog conversion means for converting the accessed sampled amplitudes from said sine waveshape memory to musical tones.

16. A digital electronic musical instrument according to claim 15 wherein said produced time interval control signals cause said bit shift circuitry means to access sampled amplitudes constituting a sequence of sine waves that are progressively higher harmonics of the fundamental of said musical tone, lower order harmonics being deleted from said sequence for notes of progressively higher octave.

*17. An electronic musical instrument according to claim 1 wherein:*

*said means for repeatedly generating a waveshape comprises:*

*means for generating uniformly progressing phase angle information beginning from a predetermined phase point of the fundamental period of a musical tone to be generated,*

*phase modifying means for modifying the generated uniformly progressing phase information, and*

*a waveshape memory storing samples of a sinusoidal waveshape, and means for reading out the same in accordance with said modified phase information from said phase modifying means, the frequency of said read out waveshape effectively changing as the generated phase information is modified during said fundamental period; and*

*wherein said amplitude control means comprises;*

*means, responsive to said uniformly progressing phase angle information, for providing amplitude control information which varies with time within said fundamental period, and*

*multiplier means for multiplying the waveshape sample values read out from said waveshape memory by said amplitude control information, the output of said multiplier means being supplied to said sound system means.*

*18. An electronic musical instrument comprising:*

*means for repeatedly generating a waveshape having a frequency which changes as a function of time from the start point of said waveshape, including:*

*means for generating uniformly progressing phase angle information beginning from a predetermined phase point of the fundamental period of a musical tone to be generated,*

*phase modifying means for modifying the generated uniformly progressing phase information, and*

*a waveshape memory storing samples of a sinusoidal waveshape, and means for reading out the same in accordance with said modified phase information from said phase modifying means, the frequency of said read out waveshape effectively changing as the generated phase information is modified during said fundamental period; and*

*amplitude control means for controlling the amplitude of said waveshape in correspondence with said frequency changing as a function of time within said fundamental period, including:*

*means, responsive to said uniformly progressing phase angle information, for providing amplitude control information which varies with time within said fundamental period, and*

*multiplier means for multiplying the waveshape sample values read out from said waveshape memory by said amplitude control information; and*

*sound system means for producing a musical tone from the output of said multiplier means.*

*19. An electronic musical instrument according to claim 18 wherein said means for repeatedly generating a waveshape terminates each repeated generation in less than a period of said fundamental period of said musical tone.*

* * * * *